(12) United States Patent
Fyffe et al.

(10) Patent No.: US 11,650,344 B2
(45) Date of Patent: May 16, 2023

(54) SYSTEMS AND METHODS FOR THRUSTER-POWERED TETHER MANAGEMENT SYSTEM

(71) Applicant: MAGSEIS FF LLC, Houston, TX (US)

(72) Inventors: Roger L. Fyffe, Sugar Land, TX (US);
Etienne Marc, Houston, TX (US);
Chance Mann, Houston, TX (US)

(73) Assignee: Magseis FF LLC, Houston, TX (US)

( * ) Notice: Subject to any disclaimer, the term of this patent is extended or adjusted under 35 U.S.C. 154(b) by 1094 days.

(21) Appl. No.: 16/153,236

(22) Filed: Oct. 5, 2018

(65) Prior Publication Data
US 2020/0110188 A1 Apr. 9, 2020

(51) Int. Cl.
| | |
|---|---|
| *G01V 1/38* | (2006.01) |
| *B63G 8/42* | (2006.01) |
| *B63B 21/66* | (2006.01) |
| *B63G 8/08* | (2006.01) |
| *B63G 8/39* | (2006.01) |

(52) U.S. Cl.
CPC ............ *G01V 1/3852* (2013.01); *B63B 21/66* (2013.01); *B63G 8/42* (2013.01); *G01V 1/3817* (2013.01); *G01V 1/3843* (2013.01); *B63B 2211/02* (2013.01); *B63G 8/08* (2013.01); *B63G 8/39* (2013.01)

(58) Field of Classification Search
CPC .. G01V 1/3852; G01V 1/3817; G01V 1/3843; B63B 21/66; B63G 8/42
USPC ......................................................... 405/190
See application file for complete search history.

(56) References Cited

U.S. PATENT DOCUMENTS

| | | | |
|---|---|---|---|
| 2005/0276665 A1* | 12/2005 | Entralgo ................. | B63C 11/42 405/190 |
| 2006/0159524 A1* | 7/2006 | Thompson ........... | G01V 1/3852 405/190 |
| 2016/0121983 A1 | 5/2016 | Rokkan et al. | |
| 2016/0176486 A1* | 6/2016 | Korneliussen ......... | B63G 8/001 114/257 |
| 2017/0017007 A1 | 1/2017 | Woodward et al. | |
| 2017/0341714 A1 | 11/2017 | Barry et al. | |

OTHER PUBLICATIONS

International Preliminary Report on Patentability, Ch. I, for PCT Appln. Ser. No. PCT/US2019/054351 dated Apr. 15, 2021 (8 pages).
International Search Report and Written Opinion for PCT Appln. Ser. No. PCT/US2019/054351 dated Jan. 13, 2020 (13 pages).

\* cited by examiner

*Primary Examiner* — Ian J Lobo
(74) *Attorney, Agent, or Firm* — Sage Patent Group

(57) ABSTRACT

The present disclosure is directed to delivering nodes to an ocean bottom. A system can include a tether management system (TMS) towed by a vessel that moves on the surface of the ocean in a first direction. An underwater vehicle (UV) can be connected to the TMS and can move in a second direction that is different from the first direction. A thruster can be coupled to the TMS can cause the TMS to move in a third direction that is different from the first direction. A control unit can control the thruster to move the TMS in the third direction based on a cross-line location policy, and cause the UV to deploy nodes to target locations on the ocean bottom.

19 Claims, 11 Drawing Sheets

SYSTEMS AND METHODS FOR THRUSTER-POWERED TETHER MANAGEMENT SYSTEM

BACKGROUND

Seismic data may be evaluated to obtain information about subsurface features. The information can indicate geological profiles of a subsurface portion of earth, such as salt domes, bedrock, or stratigraphic traps, and can be interpreted to indicate a possible presence or absence of minerals, hydrocarbons, metals, or other elements or deposits.

SUMMARY

Performing an ocean bottom seismic survey to detect the presence or absence of minerals, hydrocarbons, metals, or other elements or deposits can include placing ocean bottom seismic data acquisition units on the ocean bottom or seabed. Depending the size of the survey and the width between survey lines, a vessel can make numerous passes to deploy hundreds, thousands or more seismic data acquisition units at specific, predetermined positions on the ocean bottom. However, due to the large size of the seismic survey, the width between survey lines, and the large number of seismic data acquisition units being deployed, it can be challenging to efficiently deploy the large number of seismic data acquisition units at the specified locations without excessive resource consumption or utilization by virtue of excessive vessel passes. For example, as the width between the lines increase, or the number of lines increase, then the amount of energy, battery resources, or fuel consumed or utilized by the vessel and the underwater vehicle deploying or placing the seismic data acquisitions also increases. Furthermore, as the amount of time taken to deploy the seismic data acquisition units increases, then the amount of resources consumed by the marine vessel can also increase. Thus, it can be technically challenging to perform increasingly larger seismic surveys in an energy efficient and time efficient manner due to the increased amount of time and resources utilized or consumed by the vessel and the underwater vehicle deploying the seismic data acquisition units.

Systems and methods of the present technical solution provide a system that includes a tether management system ("TMS") with a thruster. The TMS is tethered to an underwater vehicle that deploys ocean bottom seismic data acquisition units. The TMS can be connected to a vessel with a cable. As the vessel moves in a forward direction, the thruster powered TMS of the present technical solution can move the TMS to the left or right relative to the direction of motion of the vessel such that the underwater vehicle tethered to the TMS can deploy ocean bottom seismic data acquisition units at further locations. By extending the horizontal distance the underwater vehicle can travel from the vessel moving in a forward direction, the thruster powered tether management system can deploy units for a seismic survey with wider line spacing while reducing the number of passes made by the vessel, thereby reducing the amount of resources consumed by the underwater vehicle, the marine vessel, or the seismic data acquisition units themselves as the operation time can be reduced.

At least one aspect of the present technical solution is directed to a system to perform a seismic survey in a marine environment. The system includes a tether management system towed, via a first cable, by a vessel that moves through an aqueous medium in a first direction. The system also includes an underwater vehicle connected, via a second cable, to the tether management system, the underwater vehicle to move in a second direction different from the first direction to deploy seismic data acquisition units on an ocean bottom. The system includes a thruster coupled to the tether management system to move the tether management system in a third direction different from the first direction. The system includes a control unit comprising one or more processors to instruct, based on a cross-line location policy, the thruster to move the tether management system in the third direction different from the first direction to cause the underwater vehicle to deploy at least one of the seismic data acquisition units on the ocean bottom.

The control unit can determine a position of the underwater vehicle as the underwater vehicle moves in the second direction, and instruct, based on the position of the underwater vehicle and the cross-line location policy, the thruster to move in the third direction. The control unit can instruct, based on the cross-line location policy, the thruster to move the tether management system in the third direction to extend a deployment zone of the underwater vehicle. The underwater vehicle can deploy a first seismic data acquisition unit at a first location on the ocean bottom, and the control unit can instruct, subsequent to deployment of the first seismic data acquisition unit at the first location and based on the cross-line location policy, the thruster to move the tether management system in the third direction, and the underwater vehicle to deploy, subsequent to movement of the tether management system by the thruster, a second seismic data acquisition unit at a second location on the ocean bottom.

The control unit can instruct, subsequent to deployment of the second seismic data acquisition unit at the second location and based on the cross-line location policy, the thruster to move the tether management system in a fourth direction opposite the third direction, and the underwater vehicle to deploy, subsequent to movement by the thruster of the tether management system in the fourth direction, a third seismic data acquisition unit at a third location on the ocean bottom. The underwater vehicle can deploy a first seismic data acquisition unit at a first location on the ocean bottom within a first deployment zone of the underwater vehicle. The control unit can instruct, subsequent to deployment of the first seismic data acquisition unit at the first location and based on the cross-line location policy, the thruster to move the tether management system in the third direction. The underwater vehicle can deploy, subsequent to movement of the tether management system by the thruster, a second seismic data acquisition unit at a second location on the ocean bottom within a second deployment zone outside the first deployment zone. The second deployment zone may not accessible by the underwater vehicle prior to movement by the thruster of the tether management system in the third direction.

The tether management system can include the control unit. The underwater vehicle can include the control unit. The control unit can be remote from, and external to, the tether management system. The system can include a second tether management system towed, via a third cable, by the vessel, and a second underwater vehicle connected, via a fourth cable, to the second tether management system. The system can include a second tether management system towed, via a third cable, by the vessel. The system can include a second thruster coupled to the second tether management system to move the tether management system in a fourth direction different from the first direction. The system can include a second underwater vehicle connected, via a fourth cable, to the second tether management system. The second underwater vehicle can move in a fifth direction different from the first direction to deploy second seismic data acquisition units on the ocean bottom. The control unit can instruct, based on the cross-line location policy, the second thruster to move the second tether management system in the fourth direction different from the first direction to cause the second underwater vehicle to deploy at least one of the second seismic data acquisition units on the ocean bottom.

The cross-line location policy can be configured to extend a lateral range of deployment by at least 100 meters. The first direction can intersect with the second direction and the third direction. The first direction is perpendicular to the second direction, and the second direction is parallel with the third direction.

At least one aspect is directed to a method of performing a seismic survey in a marine environment. The method includes towing, by a vessel via a first cable, a tether management system through an aqueous medium in a first direction. The method includes moving, by an underwater vehicle connected, via a second cable, to the tether management system, in a second direction different from the first direction to deploy seismic data acquisition units on an ocean bottom. The method includes exerting, by a thruster coupled to the tether management system, a force to move the tether management system in a third direction different from the first direction, and instructing, by a control unit comprising one or more processors, based on a cross-line location policy, the thruster to move the tether management system in the third direction different from the first direction to cause the underwater vehicle to deploy at least one of the seismic data acquisition units on the ocean bottom.

The method can include determining a position of the underwater vehicle as the underwater vehicle moves in the second direction, and instructing, based on the position of the underwater vehicle and the cross-line location policy, the thruster to move in the third direction. The method can include instructing, based on the cross-line location policy, the thruster to move the tether management system in the third direction to extend a deployment zone of the underwater vehicle. The method can include deploying, by the underwater vehicle, a first seismic data acquisition unit at a first location on the ocean bottom. The method can include the control unit instructing, subsequent to deployment of the first seismic data acquisition unit at the first location and based on the cross-line location policy, the thruster to move the tether management system in the third direction. The method can include the underwater vehicle deploying, subsequent to movement of the tether management system by the thruster, a second seismic data acquisition unit at a second location on the ocean bottom.

The method can include instructing, subsequent to deployment of the second seismic data acquisition unit at the second location and based on the cross-line location policy, the thruster to move the tether management system in a fourth direction opposite the third direction, and deploying, by the underwater vehicle subsequent to movement by the thruster of the tether management system in the fourth direction, a third seismic data acquisition unit at a third location on the ocean bottom.

BRIEF DESCRIPTION OF THE DRAWINGS

The details of one or more embodiments of the subject matter described in this specification are set forth in the accompanying drawings and the description below. Other features, aspects, and advantages of the subject matter will become apparent from the description, the drawings, and the claims. The drawings are not intended to be drawn to scale. Like reference numbers and designations in the various drawings indicate like elements. For purposes of clarity, not every component may be labeled in every drawing. In the drawings:

DETAILED DESCRIPTION

Following below are more detailed descriptions of various concepts related to, and implementations of, methods, apparatuses, and systems for delivering seismic nodes to an ocean bottom using an underwater vehicle. The various concepts introduced above and discussed in greater detail below may be implemented in any of numerous ways.

Systems, methods, and apparatus of the present disclosure generally relate to delivering seismic data acquisition units or nodes to target locations on the ocean bottom. In some instances, an underwater vehicle can be towed by a tether connected to a tether management system, which in turn is connected by an umbilical cable to a surface vessel. During deployment, the vehicle can travel over one or more target locations on the ocean bottom. When the underwater vehicle reaches a target location, the underwater vehicle can deploy a node. The vessel can be made to travel over multiple rows or columns of target locations to deploy the desired number of nodes. This can increase the cost and the time associated with deploying nodes.

In some examples, the tether management system can include thrusters that can be controlled by a control unit to move the tether management system in a direction that is different from the direction of travel of the vessel. For example, the thrusters on the tether management system can allow movement in a direction that is laterally oriented to the direction of travel of the vessel. The lateral movement of the tether management system can widen a deployment zone of the underwater vehicle. In some instances, the underwater vehicle may also include thrusters that can move the underwater vehicle in a direction that is lateral to the direction of travel of the vessel. The lateral movements of both the tether management system and the underwater vehicle in concert can further widen the deployment zone of the underwater vehicle.

Figure 1:
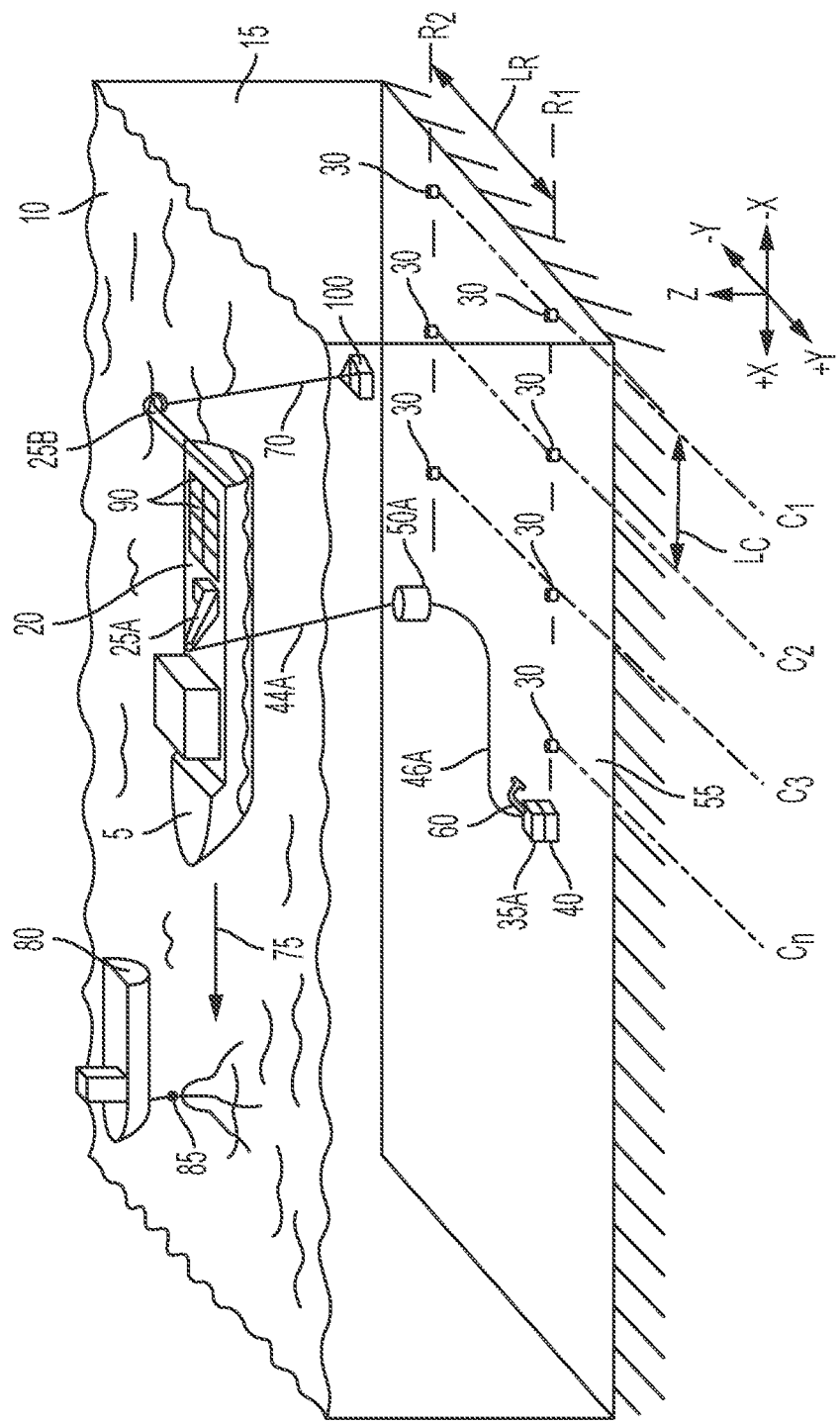
FIG. 1 is an isometric schematic view of an embodiment of a seismic operation in deep water.

Referring now to FIG. 1, an isometric schematic view of an embodiment of a seismic operation in deep water facilitated by a first marine vessel 5 is shown. The data processing system can obtain the seismic data via the seismic operation. While this figure illustrates a deep water seismic operation, the systems and methods described herein can use seismic data obtained via streamer data, land-based seismic operations. In this example, the first vessel 5 is positioned on a surface 10 of a water column 15 (also referred to as an "aqueous medium") and includes a deck 20 which supports operational equipment. At least a portion of the deck 20 includes space for a plurality of sensor device racks 90 where seismic sensor devices (or seismic data acquisition units or nodes) are stored. The sensor device racks 90 may also include data retrieval devices or sensor recharging devices.

The deck 20 also includes one or more cranes 25A, 25B attached thereto to facilitate transfer of at least a portion of the operational equipment, such as an underwater vehicle, an autonomous underwater vehicle (AUV), autonomously operated vehicle (AOV), a remotely operated underwater vehicle (ROV) or seismic sensor devices, from the deck 20 to the water column 15. An underwater vehicle can refer to or include a ROV 35A, AUV, or AOV. For example, a crane 25A coupled to the deck 20 is configured to lower and raise an ROV 35A, which transfers and positions one or more sensor devices 30 (e.g., ocean bottom seismometer "OBS" units, seismic data acquisition units, or nodes) on a seabed 55. The ROV 35A can be coupled to the first vessel 5 by a tether 46A and an umbilical cable 44A that provides power, communications, and control to the ROV 35A. A tether management system (TMS) 50A is also coupled between the umbilical cable 44A and the tether 46A. Generally, the TMS 50A may be utilized as an intermediary, subsurface platform from which to operate the ROV 35A. For most ROV 35A operations at or near the seabed 55, the TMS 50A can be positioned approximately 50 feet above seabed 55 and can pay out tether 46A as needed for ROV 35A to move freely above seabed 55 in order to position and transfer seismic sensor devices 30 thereon. The seabed 55 can include or refer to a continental shelf.

A crane 25B may be coupled (e.g., via a latch, anchor, nuts and bolts, screw, suction cup, magnet, or other fastener.) to a stern of the first vessel 5, or other locations on the first vessel 5. Each of the cranes 25A, 25B may be any lifting device or launch and recovery system (LARS) adapted to operate in a marine environment. The crane 25B may be coupled to a seismic sensor transfer device 100 by a cable 70. The transfer device 100 may be a drone, a skid structure, a basket, or any device capable of housing one or more sensor devices 30 therein. The transfer device 100 may be a structure configured as a magazine adapted to house and transport one or more sensor devices 30. The transfer device 100 may be configured as a sensor device storage rack for transfer of sensor devices 30 from the first vessel 5 to the ROV 35A, and from the ROV 35A to the first vessel 5. The transfer device 100 may include an on-board power supply, a motor or gearbox, or a propulsion system. In some embodiments, the transfer device 100 may not include any integral power devices or not require any external or internal power source. In some embodiments, the cable 70 may provide power or control to the transfer device 100. In some embodiments, the transfer device 100 can operate without external power or control. In some embodiments, the cable 70 may include an umbilical, a tether, a cord, a wire, a rope, and the like, that is configured to support, tow, position, power or control the transfer device 100.

The ROV 35A can include a seismic sensor device storage compartment 40 that is configured to store one or more seismic sensor devices 30 therein for a deployment or retrieval operation. The storage compartment 40 may include a magazine, a rack, or a container configured to store the seismic sensor devices. The storage compartment 40 may also include a conveyor, such as a movable platform having the seismic sensor devices thereon, such as a carousel or linear platform configured to support and move the seismic sensor devices 30 therein. In one embodiment, the seismic sensor devices 30 may be deployed on the seabed 55 and retrieved therefrom by operation of the movable platform. The ROV 35A may be positioned at a predetermined location above or on the seabed 55 and seismic sensor devices 30 are rolled, conveyed, or otherwise moved out of the storage compartment 40 at the predetermined location. In some embodiments, the seismic sensor devices 30 may be deployed and retrieved from the storage compartment 40 by a robotic device 60, such as a robotic arm, an end effector or a manipulator, disposed on the ROV 35A.

The seismic sensor device 30 may be referred to as seismic data acquisition unit 30 or node 30. The seismic data acquisition unit 30 can record seismic data. The seismic data acquisition unit 30 may include one or more of at least one geophone, at least one power source (e.g., a battery, external solar panel), at least one clock, at least one tilt meter, at least one environmental sensor, at least one seismic data recorder, at least global positioning system sensor, at least one wireless or wired transmitter, at least one wireless or wired receiver, at least one wireless or wired transceiver, or at least one processor. The seismic sensor device 30 may be a self-contained unit such that all electronic connections are within the unit. During recording, the seismic sensor device 30 may operate in a self-contained manner such that the node does not require external communication or control. The seismic sensor device 30 may include several geophones configured to detect acoustic waves that are reflected by subsurface lithological formation or hydrocarbon deposits. The seismic sensor device 30 may further include one or more geophones that are configured to vibrate the seismic sensor device 30 or a portion of the seismic sensor device 30 in order to detect a degree of coupling between a surface of the seismic sensor device 30 and a ground surface. One or more component of the seismic sensor device 30 may attach to a gimbaled platform having multiple degrees of freedom. For example, the clock may be attached to the gimbaled platform to minimize the effects of gravity on the clock.

For example, in a deployment operation, a first plurality of seismic sensor devices, comprising one or more sensor devices 30, may be loaded into the storage compartment 40 while on the first vessel 5 in a pre-loading operation. The ROV 35A, having the storage compartment coupled thereto, is then lowered to a subsurface position in the water column 15. The ROV 35A can utilize commands from personnel on the first vessel 5 to operate along a course to transfer the first plurality of seismic sensor devices 30 from the storage compartment 40 and deploy the individual sensor devices 30 at selected locations on the seabed 55 or ground surface 55 or sea floor 55 or earth surface 55 in a land based deployment. Once the storage compartment 40 is depleted of the first plurality of seismic sensor devices 30, the transfer device 100 (or transfer system 100) can be used to ferry a second plurality of seismic sensor devices 30 as a payload from first vessel 5 to the ROV 35A.

The transfer system 100 may be preloaded with a second plurality of seismic sensor devices 30 while on or adjacent the first vessel 5. When a suitable number of seismic sensor devices 30 are loaded onto the transfer device 100, the transfer device 100 may be lowered by crane 25B to a selected depth in the water column 15. The ROV 35A and transfer device 100 are mated at a subsurface location to allow transfer of the second plurality of seismic sensor devices 30 from the transfer device 100 to the storage compartment 40. When the transfer device 100 and ROV 35A are mated, the second plurality of seismic sensor devices 30 contained in the transfer device 100 are transferred to the storage compartment 40 of the ROV 35A. Once the storage compartment 40 is reloaded, the ROV 35A and transfer device 100 are detached or unmated and seismic sensor device placement by ROV 35A may resume. In one embodiment, reloading of the storage compartment 40 is provided while the first vessel 5 is in motion. If the transfer device 100 is empty after transfer of the second plurality of seismic sensor devices 30, the transfer device 100 may be raised by the crane 25B to the vessel 5 where a reloading operation replenishes the transfer device 100 with a third plurality of seismic sensor devices 30. The transfer device 100 may then be lowered to a selected depth when the storage compartment 40 needs to be reloaded. This process may repeat as needed until a desired number of seismic sensor devices 30 have been deployed.

Using the transfer device 100 to reload the ROV 35A at a subsurface location reduces the time required to place the seismic sensor devices 30 on the seabed 55, or "planting" time, as the ROV 35A is not raised and lowered to the surface 10 for seismic sensor device reloading. Further, mechanical stresses placed on equipment utilized to lift and lower the ROV 35A are minimized as the ROV 35A may be operated below the surface 10 for longer periods. The reduced lifting and lowering of the ROV 35A may be particularly advantageous in foul weather or rough sea conditions. Thus, the lifetime of equipment may be enhanced as the ROV 35A and related equipment are not raised above surface 10, which may cause the ROV 35A and related equipment to be damaged, or pose a risk of injury to the vessel personnel.

Likewise, in a retrieval operation, the ROV 35A can utilize commands from personnel on the first vessel 5 to retrieve each seismic sensor device 30 that was previously placed on seabed 55. The retrieved seismic sensor devices 30 are placed into the storage compartment 40 of the ROV 35A. In some embodiments, the ROV 35A may be sequentially positioned adjacent each seismic sensor device 30 on the seabed 55 and the seismic sensor devices 30 are rolled, conveyed, or otherwise moved from the seabed 55 to the storage compartment 40. In some embodiments, the seismic sensor devices 30 may be retrieved from the seabed 55 by a robotic device 60 disposed on the ROV 35A.

Once the storage compartment 40 is full or contains a pre-determined number of seismic sensor devices 30, the transfer device 100 can be lowered to a position below the surface 10 and mated with the ROV 35A. The transfer device 100 may be lowered by crane 25B to a selected depth in the water column 15, and the ROV 35A and transfer device 100 are mated at a subsurface location. Once mated, the retrieved seismic sensor devices 30 contained in the storage compartment 40 are transferred to the transfer device 100. Once the storage compartment 40 is depleted of retrieved sensor devices, the ROV 35A and transfer device 100 are detached and sensor device retrieval by ROV 35A may resume. Thus, the transfer device 100 can ferry the retrieved seismic sensor devices 30 as a payload to the first vessel 5, allowing the ROV 35A to continue collection of the seismic sensor devices 30 from the seabed 55. In this manner, sensor device retrieval time is significantly reduced as the ROV 35A is not raised and lowered for sensor device unloading. Further, mechanical stresses placed on equipment related to the ROV 35A are minimized as the ROV 35A may be subsurface for longer periods.

In this embodiment, the first vessel 5 may travel in a first direction 75, such as in the +X direction, which may be a compass heading or other linear or predetermined direction. The first direction 75 may also account for or include drift caused by wave action, current(s) or wind speed and direction. In one embodiment, the plurality of seismic sensor devices 30 are placed on the seabed 55 in selected locations, such as a plurality of rows Rn in the X direction (R1 and R2 are shown) or columns Cn in the Y direction (C1, C2, C3, and C4 are shown), wherein n equals an integer. In one embodiment, the rows Rn and columns Cn define a grid or array, wherein each row Rn comprises a receiver line in the width of a sensor array (X direction) or each column Cn comprises a receiver line in a length of the sensor array (Y direction). The distance between adjacent sensor devices 30 in the rows is shown as distance LR and the distance between adjacent sensor devices 30 in the columns is shown as distance LC. While a substantially square pattern is shown, other patterns may be formed on the seabed 55. Other patterns include non-linear receiver lines or non-square patterns. The pattern(s) may be pre-determined or result from other factors, such as topography of the seabed 55. In some embodiments, the distances LR and LC may be substantially equal (e.g., plus or minus 10% of each other) and may include dimensions between about 60 meters to about 400 meters. In some embodiments, the distances LR and LC may be different. In some embodiments, the distances LR or LC may include dimensions between about 400 meters to about 1100 meters. The distance between adjacent seismic sensor devices 30 may be predetermined or result from topography of the seabed 55 as described above.

The first vessel 5 is operated at a speed, such as an allowable or safe speed for operation of the first vessel 5 and any equipment being towed by the first vessel 5. The speed may take into account any weather conditions, such as wind speed and wave action, as well as currents in the water column 15. The speed of the vessel may also be determined by any operations equipment that is suspended by, attached to, or otherwise being towed by the first vessel 5. For example, the speed is typically limited by the drag coefficients of components of the ROV 35A, such as the TMS 50A and umbilical cable 44A, as well as any weather conditions or currents in the water column 15. As the components of the ROV 35A are subject to drag that is dependent on the depth of the components in the water column 15, the first vessel speed may operate in a range of less than about 1 knot. For example, when two receiver lines (rows R1 and R2) are being laid, the first vessel includes a first speed of between about 0.2 knots and about 0.6 knots. In some embodiments, the first speed includes an average speed of between about 0.25 knots, which includes intermittent speeds of less than 0.25 knots and speeds greater than about 1 knot, depending on weather conditions, such as wave action, wind speeds, or currents in the water column 15.

During a seismic survey, one receiver line, such as row R1 may be deployed. When the single receiver line is completed a second vessel 80 can be used to provide a source signal. The second vessel 80 can be provided with a source device 85, which may be a device capable of producing acoustical signals or vibrational signals suitable for obtaining the survey data. The source signal propagates to the seabed 55 and a portion of the signal is reflected back to the seismic sensor devices 30. The second vessel 80 may be required to make multiple passes, for example at least four passes, per a single receiver line (row R1 in this example). During the time the second vessel 80 is making the passes, the first vessel 5 continues deployment of a second receiver line. However, the time involved in making the passes by the second vessel 80 can be shorter than the deployment time of the second receiver line. This causes a lag time in the seismic survey as the second vessel 80 sits idle while the first vessel 5 is completing the second receiver line.

In some embodiments, the first vessel 5 can utilize an ROV 35A to lay sensor devices to form a first set of two receiver lines (rows R1 and R2) in any number of columns, which may produce a length of each receiver line of up to and including several miles. The two receiver lines (rows R1 and R2) can be substantially parallel, e.g. within +/−20 degrees of parallel. When a single directional pass of the first vessel 5 is completed and the first set (rows R1, R2) of seismic sensor devices 30 are laid to a predetermined length, the second vessel 80, provided with the source device 85, is utilized to provide the source signal. The second vessel 80 may make eight or more passes along the two receiver lines to complete the seismic survey of the two rows R1 and R2.

While the second vessel 80 is shooting along the two rows R1 and R2, the first vessel 5 may turn 180 degrees and travel in the −X direction in order to lay seismic sensor devices 30 in another two rows adjacent the rows R1 and R2, thereby forming a second set of two receiver lines. The second vessel 80 may then make another series of passes along the second set of receiver lines while the first vessel 5 turns 180 degrees to travel in the +X direction to lay another set of receiver lines. The process may repeat until a specified area of the seabed 55 has been surveyed. Thus, the idle time of the second vessel 80 is minimized as the deployment time for laying receiver lines is cut approximately in half by deploying two rows in one pass of the vessel 5.

Although only two rows R1 and R2 are shown, the sensor device 30 layout is not limited to this configuration as the ROV 35A may be adapted to layout more than two rows of sensor devices in a single directional tow. For example, the ROV 35A may be controlled to lay out between three and six rows of sensor devices 30, or an even greater number of rows in a single directional tow. The width of a "one pass" run of the first vessel 5 to layout the width of the sensor array is typically limited by the length of the tether 46A or the spacing (distance LR) between sensor devices 30.

Figure 2:
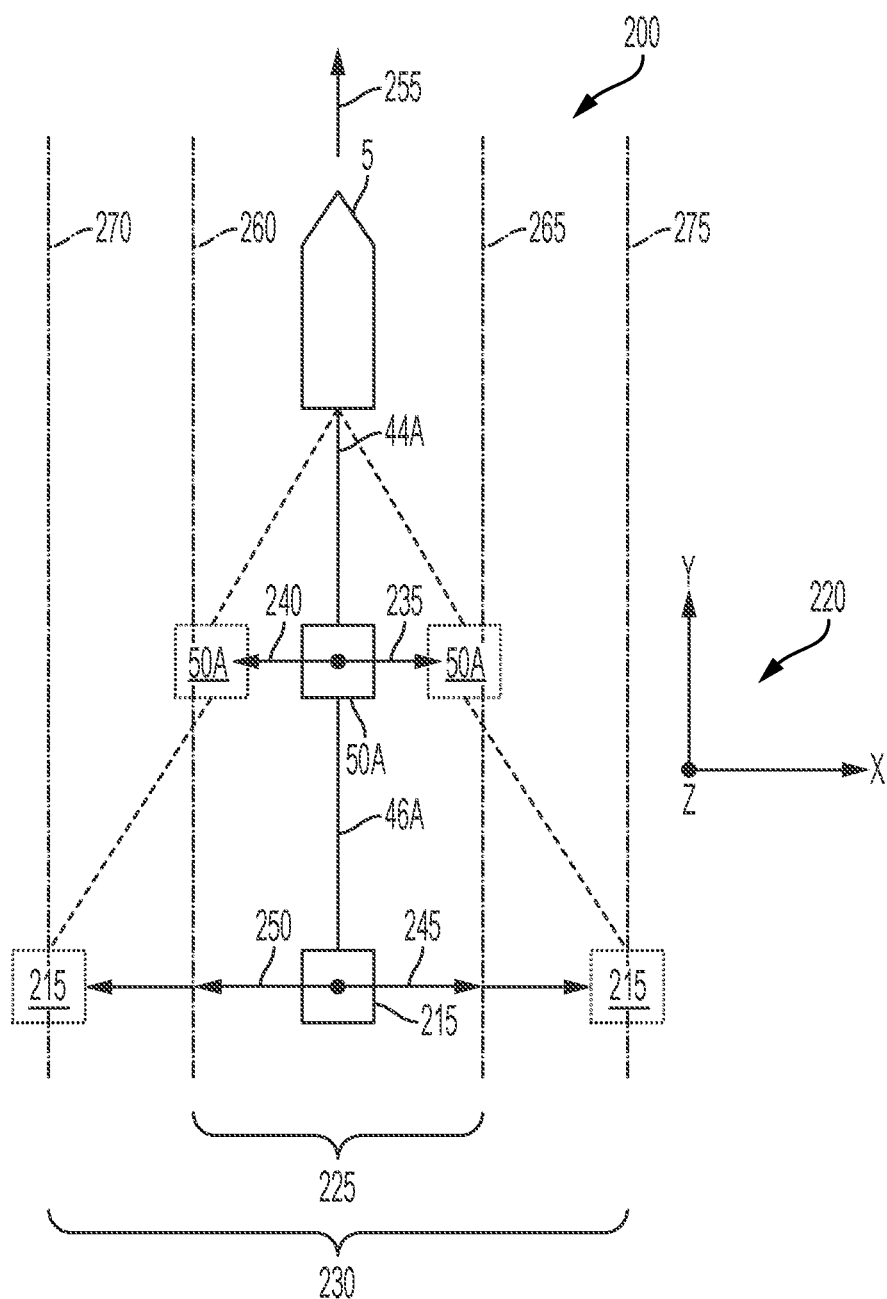
FIG. 2 shows a top schematic view of a system for acquiring seismic data in accordance with an embodiment.

FIG. 2 shows a top schematic view of a system 200 for acquiring seismic data in accordance with an embodiment. The system includes a vessel 5, a TMS 50A, and an underwater vehicle 215. The vessel 5, the TMS 50A, and the underwater vehicle 215 can be similar to the vessel 5, the TMS 50A and the ROV 35A, respectively, discussed above in relation to FIG. 1. The underwater vehicle 215 can refer to or include one or more component or functionality of ROV 35A, AOV or AUV. The underwater vehicle 215 can be tethered to the vessel 5, or be untethered and operate autonomously without external communication or commands from the vessel 5. The vessel 5 can be positioned on the surface of an ocean, and can travel in a first direction 255 with respect to a frame of reference 220 that includes Cartesian X, Y, and Z axes. In the example shown in FIG. 2, the vessel 5 can travel in the positive-Y direction. However, the first direction 255 of travel of the vessel 5 is only an example, and the vessel 5 may travel in any direction on the surface of the ocean. An umbilical cable 44A can be coupled between the vessel 5 and the TMS 50A. The umbilical cable 44A can be similar to the umbilical cable 44A shown in FIG. 1 that connects between the vessel 5 and the TMS 50A. A tether 46A can be coupled between the underwater vehicle 215 and the TMS 50A. The tether 46A can be similar to the tether 46A coupled between the TMS 50A and the ROV 35A shown in FIG. 1. The umbilical cable 44A and the tether 46A can provide power, communication, and control from the vessel 5 to the TMS 50A and the underwater vehicle 215. In addition, the umbilical cable 44A and the tether 46A can pull the TMS 50A and the underwater vehicle 215 in the direction of travel of the vessel 5. The underwater vehicle 215 can be positioned to move close the ocean bottom, while the TMS 50A can be positioned to move at a depth between the surface of the ocean and the surface bottom. The lengths of the umbilical cable 44A and the tether 46A can be adjusted to appropriately position the TMS 50A and the underwater vehicle 215.

In an example seismic sensor deployment operation, the vessel 5 can move in the first direction 255, towing the TMS 50A and the underwater vehicle 215 behind it. The TMS 50A and the underwater vehicle 215 can move approximately directly behind the vessel 5. As a result, when the underwater vehicle 215 deploys seismic sensors on the ocean bottom, the seismic sensors would be deposited collinearly at various locations along a first direction 255 of the vessel 5. If deployment of additional seismic sensors at locations lateral to the first direction 255 is desired, then the vessel 5 would have to carry out another deployment run and adjust its travel direction so that it is directly above the desired deployment locations. Additional deployment runs can increase the cost of the deployment operation.

In some instances, the underwater vehicle 215 can include a propulsion system that can allow the underwater vehicle 215 to move laterally with respect to the direction of motion of the vessel 5. For example, the underwater vehicle 215 can use the propulsion system to cause the underwater vehicle 215 to move in a second direction 245, which is laterally oriented with respect to the first direction 255 of the vessel 5 and to the right of the vessel 5. The second direction 245, when viewed in the frame of reference 220, is parallel to the positive-X direction and is orthogonal to the first direction 255. However, the second direction 245 can be any direction that has a non-zero component in the positive-X direction or in a direction that is orthogonal to the first direction 255. For example, the second direction 245 can be about forty-five degrees with respect to the first direction 255. In another example, the second direction can make any angle with respect to the first direction 255. The propulsion system can cause the underwater vehicle 215 to also move to the left of the vessel 5 in a direction 250 that is opposite to the second direction 245. In addition, similar to the second direction 245, the direction 250 can form any angle with the first direction 255.

The extent to which the underwater vehicle 215 can be moved laterally in relation to the first direction 255 can be based on several factors, such as, for example, a length of the tether 46A, a power of the propulsion system, a speed of the vessel 5 in the first direction 255, etc. As an example, the extent to which the underwater vehicle 215 can move on either side of the vessel 5 can be defined as a first deployment zone 225. The first deployment zone 225 is bounded by a first left boundary 260 and a first right boundary 265. The first left boundary 260 can be the farthest extent on the left of the vessel 5 to which the underwater vehicle 215 can deploy seismic sensor devices. Similarly, the first right boundary 265 can be the farthest extent on the right of the vessel 20 to which the underwater vehicle 215 can deploy seismic sensor devices. Thus, with the ability to move laterally with respect to the first direction 255 of the vessel 5, the underwater vehicle 215 can deploy seismic sensor devices anywhere within the first deployment zone. It should be noted that the first deployment zone 225 can be based on the assumption that the TMS 50A to which the underwater vehicle 215 is tethered via the tether 46A may not include a propulsion system.

In some examples, the TMS 50A also can include a propulsion system. The propulsion system of the TMS 50A, similar to the propulsion system of the underwater vehicle 215, can allow the movement of the TMS 50A in the lateral direction in relation to the first direction 255 of the vessel 5. For example, the TMS 50A can move in a third direction 235 that is lateral in relation to the first direction 255 of the vessel 5 and is to the right of the vessel 5. The third direction 235 is along the positive-X direction and is orthogonal to the first direction 255. However, the third direction 235 can form any angle with respect to the first direction 255. For example, the third direction 235 can form a forty-five degree angle with respect to the first direction 255. In some examples, the third direction 235 can form any angle that has a non-zero magnitude in the positive-X direction, or a direction that is orthogonal to the first direction 255. The propulsion system of the TMS 50A can also allow the TMS 50A to move laterally towards the left of the vessel 5 in a direction 240 that is opposite to the third direction 235. Similar to the third direction 235, the direction 240 can form any angle with respect to the first direction 255 of the vessel 5. In some examples, the third direction 235 can be parallel to the second direction 245. In some examples, the first direction 255 can intersect the second direction 245 and the third direction 235.

The extent to which the TMS 50A can be moved laterally in relation to the first direction 255 of the vessel 5 can be based on factors, such as, for example, a length of the cable 44A, a power of the propulsion system, a speed of the vessel 5 in the first direction 255, the load offered by the tether 46A and the underwater vehicle 215, etc. An advantage of the ability to move both the TMS 50A and the underwater vehicle 215 in the lateral direction is the potential increase in a width of the deployment zone. For example, as shown in FIG. 2, in one example configuration, both the TMS 50A and the underwater vehicle 215 can be moved in the third direction 235 and in the second direction 245, respectively, to the right of the vessel 5. Similarly, in another example configuration shown in FIG. 2, both the TMS 50A and the underwater vehicle 215 can be moved to the left of the vessel 5 in the direction 240 and the direction 250, respectively. As a result, the extent to which the underwater vehicle 215 can deploy seismic sensor devices on the ocean bottom can increase by the extent of movement of the TMS 50A. For example, the deployment zone for deploying seismic sensor devices can increase from the first deployment zone 225 to a second deployment zone 230. The second deployment zone 230 can be bounded by the second left boundary 270 and the second right boundary 275. A lateral distance of the second left boundary 270 from the vessel 5 can be greater than a lateral distance of the first left boundary 260 from the vessel 5. Similarly, a lateral distance of the second right boundary 275 from the vessel 5 can be greater than the lateral distance of the first right boundary 265 from the vessel 5. In some examples, the lateral distances from the vessel 5 to each of these boundaries can be measured orthogonal to the first direction 255 of the vessel 5. An increase in the width of the deployment zone is facilitated at least by the lateral movement of the TMS 50A in a direction that is different from the direction of travel (the first direction 255) of the vessel 5. In some instances, a lateral range of deployment can be extended by at least 1000 meters. For example, the lateral range of the second deployment zone 230 can be at least 1000 meters larger than the lateral range of the first deployment zone 225. In some instances, a largest increase in the deployment zone can be achieved when the second direction 245 and the third direction 235 are parallel and are orthogonal to the first direction 255.

Another technical advantage of providing propulsion to the TMS 50A is the reduction in the tether length that would have otherwise been needed to achieve the increase in the deployment zone with a longer tether alone. For example, one approach to increasing the deployment zone would be to increase the length of the cable 44A and the tether 46A, and rely on increase in the deployment zone based on the propulsion system of the underwater vehicle 215. However, increasing the length of the cable 44A or the tether 46A can also increase the stress on cable 44A or tether 46A, thereby increasing the risk of failure. By providing propulsion to the TMS 50A, the lengths of the cable 44A or the tether 46A can be reduced without a relative reduction in the deployment zone. As a result, the stress, and the associated failure risk, on the cable 44A and the tether 46A can be reduced.

Yet another technical advantage of providing propulsion to the TMS 50A is the ability to keep safe separation between the TMS 50A and other subsea vehicles, such as, for example, the underwater vehicle 215. In instances where the TMS 50A does not include a propulsion system, there can be a risk of collision between the TMS 50A and the underwater vehicle 215. However, by providing propulsion to the TMS 50A, the position of the TMS 50A can be actively controlled and safe separation between the TMS 50A and other subsea vehicles, such as, for example, the underwater vehicle 215, can be maintained. As a result, the risk of collision between the TMS 50A and other subsea vehicles can be reduced.

Figure 3:
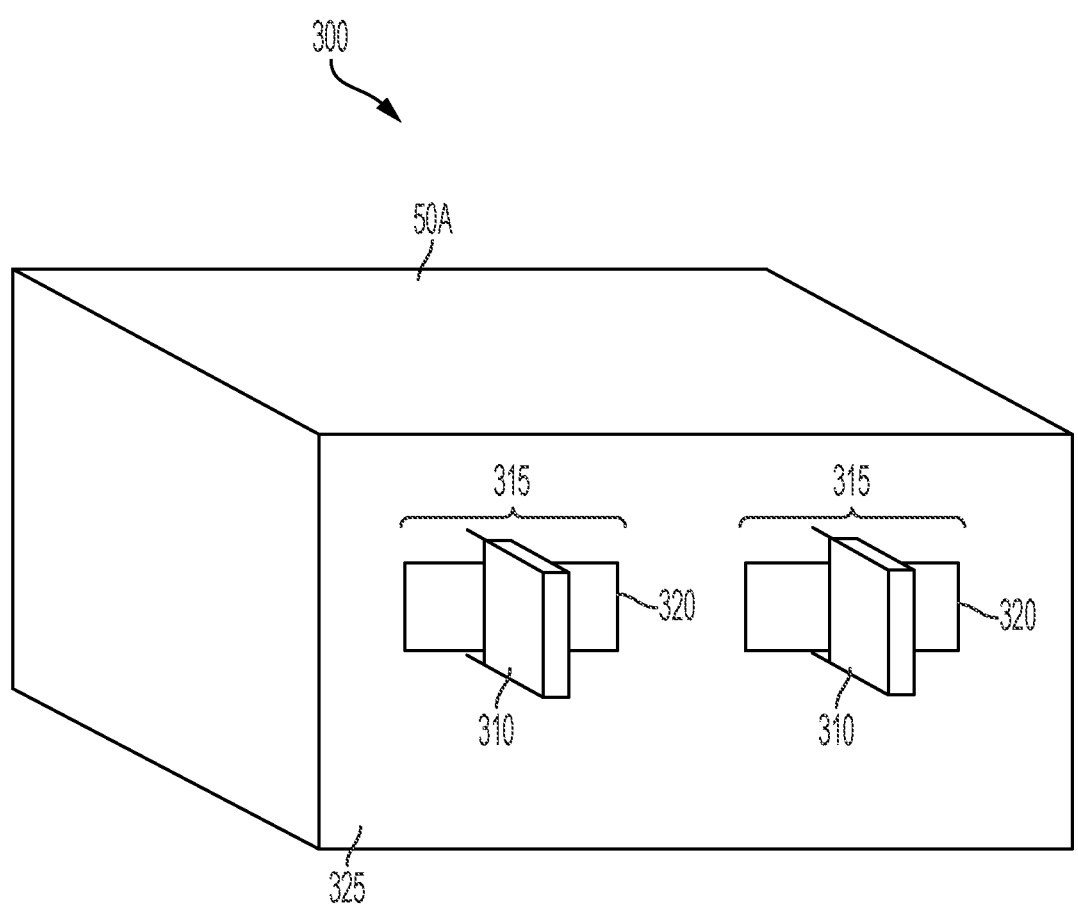
FIG. 3 illustrates a perspective view of a tether management system having a propulsion system in accordance with an embodiment.

FIG. 3 illustrates a perspective view of a tether management system having a propulsion system. The system 300 illustrated in FIG. 3 can be used, for example, to implement the TMS 50A shown in FIG. 1. The system 300 can include one or more steering devices 310 and one or more propulsion systems 105. The steering device 310 can steer or orient the TMS 50A as the propulsion device 315 generates force to move the TMS 50A.

The propulsion device 315 can include a force generation mechanism 320 (or thruster) to generate force, such as a propeller, a thruster, a paddle, an oar, a waterwheel, a screw propeller, a fixed pitch propeller, a variable pitch propeller, a ducted propeller, an azimuth propeller, a water jet, a fan, or a centrifugal pump. The force generation mechanism 320 can include a fluid propulsion system such as a pump-jet, hydrojet, or water jet that can generate a jet of water for propulsion. The force generation mechanism 320 can include a mechanical arrangement having a ducted propeller with a nozzle, or a centrifugal pump and nozzle. The force generation mechanism 320 can have an intake or inlet (e.g., facing a bottom of the TMS 50A) that allows water to pass into the propulsion device 315. The water can enter the pump of the propulsion system through the inlet. The water pressure inside the inlet can be increased by the pump and forced backwards through a nozzle. The propulsion device 315 can include a reversing bucket. With the use of a reversing bucket, reverse thrust can be generated. The reverse thrust can facilitate slowing movement of the TMS 50A as the movement of the vessel 5 slows.

The system 300 can include one or more propulsion systems 315. The propulsions system 315 can be integrated with, or mechanically coupled to, a portion of the TMS 50A. The propulsion device 315 can be built into a portion of the TMS 50A. The propulsion device 315 can be attached onto the portion of the TMS 50A using an attachment or coupling mechanism such as one or more screws, bolts, adhesives, grooves, latches, or pins.

The system 300 can include multiple propulsion systems. The multiple propulsions systems 315 can be centrally controlled or individually controlled by a control unit. The multiple propulsions systems can be independently activated or synchronously activated.

The system 300 can include a propulsion device 315 located on a portion of the TMS 50A. For example, the propulsion device 315 can be located on a back end 325 of the TMS 50A that faces a direction opposite the direction of movement. The propulsion device 315 can be located in the center of the back end 325, on a left side of the back end 325 or a right side of the back end 325. The propulsion device 315 can, in some embodiments, span a width of the back end 325. The propulsion device 315 can be mechanically coupled to the back end 325, extend off from the back end 325, or be integrated or built-into the back end 325. The propulsions system 315 can be removably, mechanically coupled to the back end 325. The propulsions system 315 can be permanently or fixedly mechanically coupled to the back end 325. In some embodiments, the back end 325 can be removably coupled to the TMS 50A, while the propulsion device 315 is fixedly coupled to, or integrated with, the back end 325.

The TMS 50A can include two propulsion systems 315 (or two propulsion systems 315 can be attached to the back end 325). For example, a first propulsions system can be located on the left side of the back end 325, and a second propulsion system can be located on the right side of the back end 325. The two propulsion systems 315 can be separated by a predetermined distance. The predetermined distance of separation can facilitate allowing the two propulsion systems 315 to move the system 300 in a direction. For example, the predetermined distance of separation can allow the two propulsion systems 315 to steer the TMS 50A by allowing a first propulsions system 315 to generate a greater force relative to a second propulsions system 315 on the back end 325. By generating different amounts of force, the two propulsion systems 315 can steer or control a direction of movement of the system 300 or TMS 50A.

The different amounts of force generated by the two propulsion systems 315 on the TMS 50A can facilitate orienting the system 300 in a direction. For example, the two propulsion systems 315 can facilitate the movement of the TMS 50A in a lateral direction in relation to the direction of travel of the vessel. For example, referring to FIG. 2, the propulsion systems 315 can facilitate the movement of the TMS 50A in the third direction 235, the direction 240, or any direction that is at an angle with respect to the first direction 255 of the vessel 5.

The system 300 can include one or more steering devices 310. The steering device 310 can refer to a steering apparatus 310 that includes multiple components. The steering device 310 can receive instructions from the propulsion device 315 or a control unit 110. The steering device 310 can include, for example, a rudder. In some embodiments, the steering device 310 can include fins or runners. For example, the steering device 310 can include an actuator, spring-mechanism, or hinge that can pivot, rotate or change the orientation of one or more of the fins, runners, or rudders to steer the TMS 50A.

The steering device 310 can use the propulsion device 315, or component thereof, to steer the system 300. For example, the propulsion device 315 can include a nozzle and pump-jets. The nozzle can provide the steering of the pump-jets. Plates or rudders 310 can be attached to the nozzle in order to redirect the water flow from one side to another side (e.g., port and starboard; right and left). The steering device 310 can function similar to air thrust vectoring to provide a pumpjet-powered system 300 with increased agility in the aqueous medium.

Figure 4:
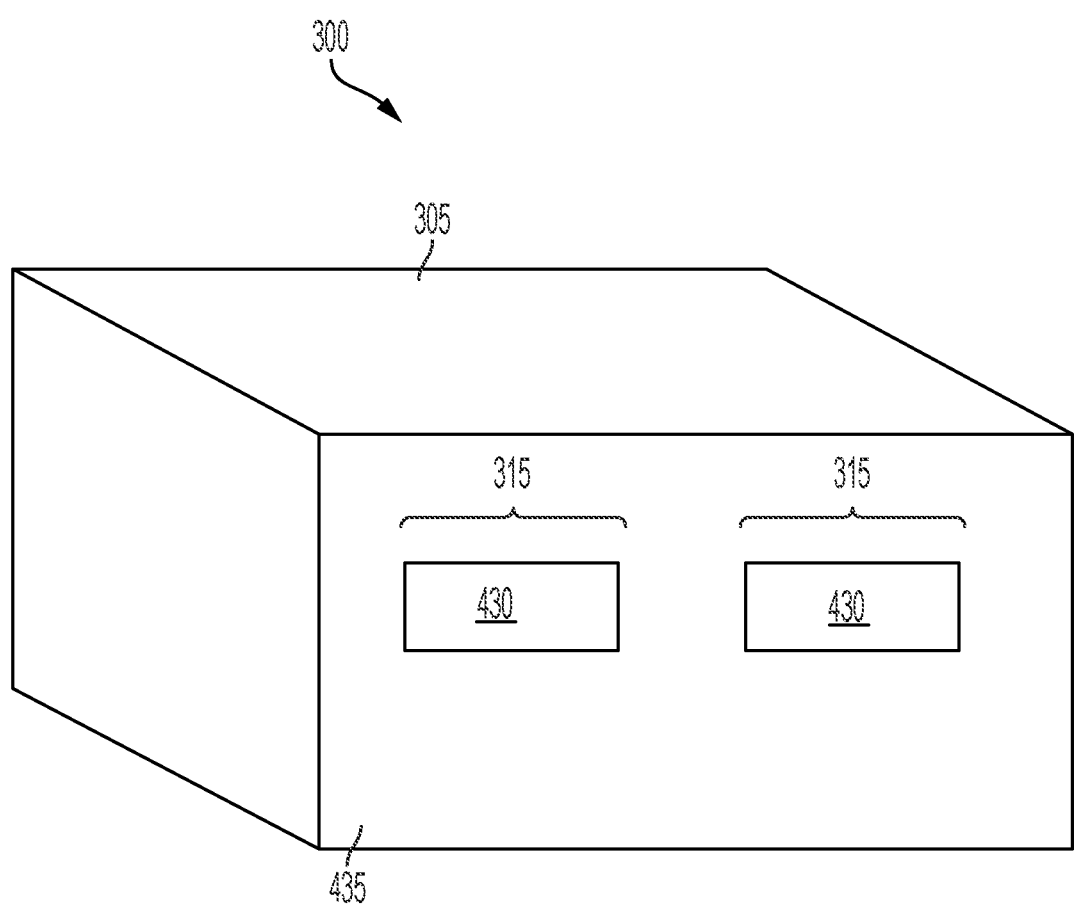
FIG. 4 depicts a front side perspective view of the tether management system shown in FIG. 3.

FIG. 4 depicts a front side perspective view of the tether management system shown in FIG. 3. The propulsion device 315 can include a front end 435 and a back end 325. The back end 325 can include an inlet, and the front end 435 can include an outlet 430. Water can go into the inlet and flow out of the outlet 430. The propulsion device 315 can include an engine or a pump that receives water via the inlet, and pumps water out via outlet 430 to form a jet stream that can generate force to move the TMS 50A thereof.

The force generation mechanism 320 of system 300 can include one or more pairs of inlets 320 and outlets 430. The pair of inlet 320 and outlet 430 can be located on the TMS 50A. The inlet 320 can be connected to the outlet 430 by a tube or pipe. An engine can be located in between the inlet 320 and outlet 430 to generate force to draw water into the inlet and push water out of the outlet to thrust the TMS 50A or system 300 in the desired direction.

While FIGS. 3 and 4 discuss a propulsion system in relation to the TMS, a similar propulsion system can be implemented to provide propulsion to the underwater vehicle 215 shown in FIG. 2. The propulsion system can provide thrust to move the underwater vehicle 215 in a direction that is lateral to the direction of travel (the first direction 255) of the vessel 5. A combination of the side-way thrust provided to the TMS and to the ROV can result in a widening of the deployment zone for deploying seismic sensor devices.

Figure 5:
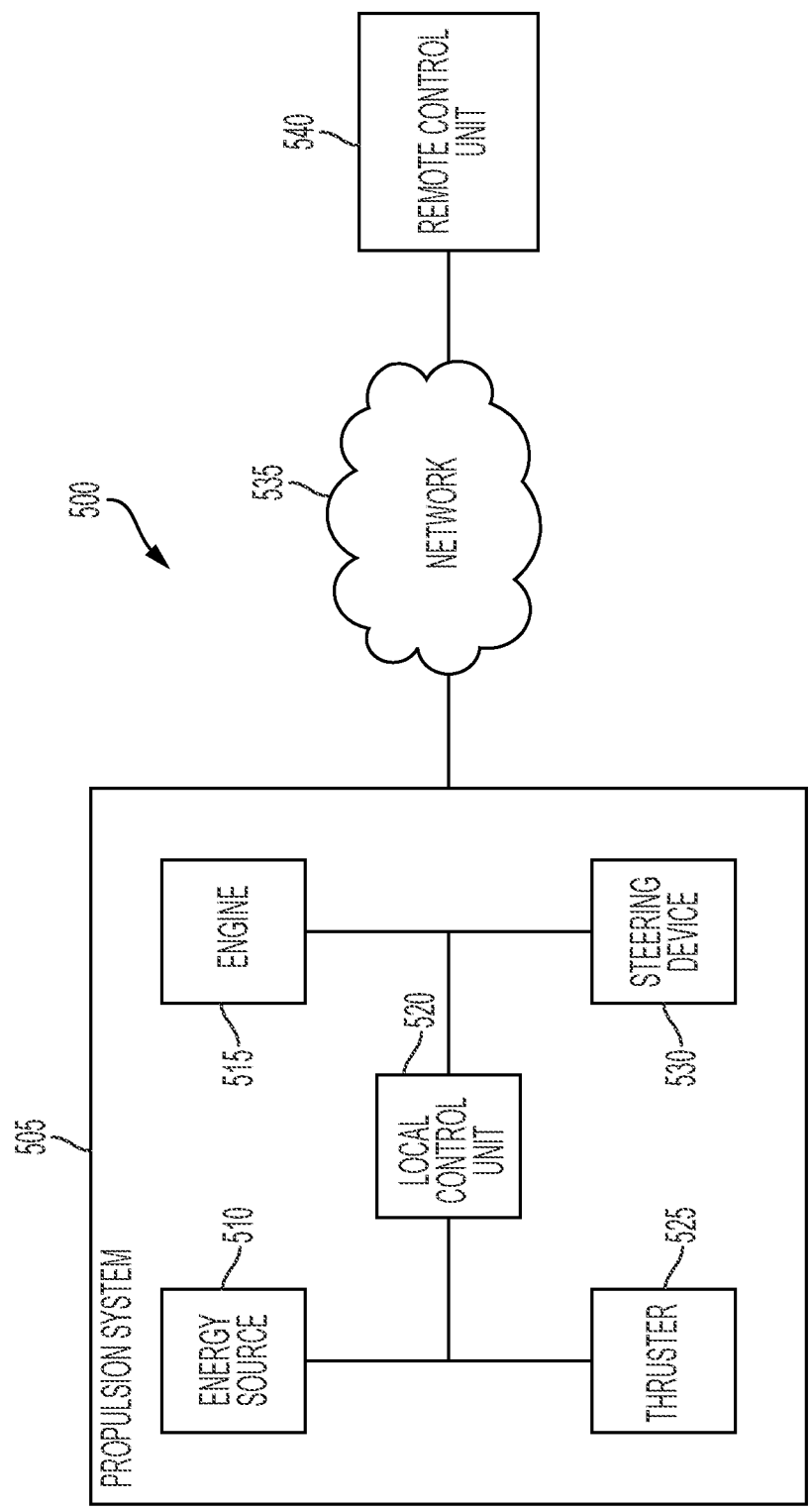
FIG. 5 shows a block diagram of an example system for deploying seismic sensor devices in accordance with an embodiment.

FIG. 5 shows a block diagram of an example system 500 for deploying seismic sensor devices. The system 500 can include a propulsion system 505. The propulsion system 505 can include, interface or communicate with one or more system, component or functionality of propulsion device 315 depicted in FIG. 3. The propulsion system 505 can include one or more of at least one energy source 510, at least one local control unit 520, at least one engine 515, at least one thruster 525, and at least one steering device 530. The propulsion system 505 can communicate with a remote control unit 540 via a network 535. For example, the propulsion system 505 can receive, via network 535, an instruction from remote control unit 540 to generate force to move the TMS 50A or the underwater vehicle 215. The local control unit 520 can receive the instruction and, responsive to the instruction, cause the engine 515 to convert energy provided by the energy source 510 into force. The engine 515 can convey the energy or force to a thruster 525, such as a propeller or pump. The thruster 525 can include one or more component or functionality of propulsion device 315 depicted in FIGS. 3 and 4.

The energy source 510 can include a battery, fuel, fossil fuel, petroleum, gasoline, natural gas, oil, coal, fuel cell, hydrogen fuel cell, solar cell, wave power generator, hydropower, or uranium atoms (or other fuel source for a nuclear reactor). The energy source 510 can be located on the TMS 50A or the underwater vehicle 215. The energy source 510 can be located on the vessel 5, and the vessel 5 can provide power to the engine 515 via a power cable, such as the umbilical cable 44A or the tether 46A. The energy source 510 can include a sensor or monitor that measures an amount of power or fuel remaining in the energy source 510. The sensor or monitor can provide an indication as to the amount of fuel or power remaining in the energy source 510 to the local control unit 520. The local control unit 520 can conserve the energy source 510 by reducing the amount of force generated using energy from the energy source. The local control unit 520 can provide the indication of the amount of fuel remaining to the remote control unit 540.

The propulsion system 505 can include an engine 515. The engine 515 can convert energy provided by the energy source 510 to mechanical energy or force. The engine 515 can convert the energy provided by the energy source 510 to mechanical energy responsive to an instruction from the local control unit 520 or remote control unit 540. The engine 515 can include a motor. The engine 515 can include a heat engine, internal combustion engine, or external combustion engine. The engine 515 can include an electric motor that converts electrical energy into mechanical motion. The engine 515 can include a nuclear reactor that generates heat from nuclear fission. The engine 515 can include a pneumatic motor that uses compressed air to generate mechanical motion. The engine 515 can use chemical energy to create force.

The engine 515 can transfer the mechanical energy to a thruster 525. The thruster 525 can include any device or mechanism that can generate force to move the TMS 50A or the underwater vehicle 215 in a desired direction through the aqueous medium. The thruster 525 can include a propeller, a paddle, an oar, a waterwheel, a screw propeller, a fixed pitch propeller, a variable pitch propeller, a ducted propeller, an azimuth propeller, a water jet, a fan, or a pump. The engine 515 can provide the thruster 525 with mechanical energy to generate force. For example, the engine 515 can provide mechanical energy to spin or rotate a propeller. The engine 515 can provide mechanical energy to a pump to generate pressure to create a water jet that propels or move TMS 50A or the underwater vehicle 215 in the desired direction.

The propulsion system 505 can include a steering device 530 (e.g., steering device 310 shown in FIG. 3). The steering device 530 can include a rudder or use a fin, plate or runner as a rudder. The steering device 530 can steer the case by generating greater force on one side of the TMS 50A or the underwater vehicle 215 relative to another side. For example, the TMS 50A can have two propulsion systems 505 or two thrusters 315 (FIGS. 3 and 4) separated by a distance. By generating greater force via one of the thrusters 315 relative to the other thruster 315, the TMS 50A can be steered through the aqueous medium. The propulsion system 505 can be similarly operated to move the underwater vehicle 215 in the desired direction.

The propulsion system 505 can include a local control unit 520. In some embodiments, the system 500 can include a local control unit 520 and a remote control unit 540. In some embodiments, the system 500 may include one of the local control unit 520 or the remote control unit 540. The local control unit 520 can include one or more function or component depicted in FIG. 9. The local control unit 520 can be designed and constructed to cause the engine 515 to convert the energy provided by energy source 510 to mechanical energy to push surrounding water away from the TMS 50A or the underwater vehicle 215 in a direction opposite a direction of movement of the TMS 50A or the underwater vehicle 215. The engine 515 can cause a thruster 525 to create force that moves the water in a direction opposite to the desired direction of motion of the case.

The local control unit 520 can monitor the speed or velocity of the TMS 50A or the underwater vehicle 215. The local control unit 520 can include a GPS sensor, gyroscope, or accelerometer. The GPS sensor can receive GPS signals from a GPS satellite to determine a location of the TMS 50A or the underwater vehicle 215. The GPS sensor can provide the location information (e.g., latitude and longitude coordinates) to the local control unit 520 or the remote control unit 540. The accelerometer can determine an acceleration, speed or velocity of the TMS 50A or the underwater vehicle 215 (e.g., knots, nautical miles per hour, miles per hour, or meters per hour). The gyroscope can determine an orientation of the TMS 50A or the underwater vehicle 215. The control unit 520 can determine one or more of the location, velocity, or orientation from these components. The local control unit 520 can use this information to determine how much force to generate to move the TMS 50A or the underwater vehicle 215. The local control unit 520 can provide this information to the remote control unit 540, which can, in-turn, process the information and provide instructions to the local control unit 520.

The remote control unit 540 can be external to the propulsion system 505. The remote control unit 540 can be located on the vessel 5. The remote control unit 540 can provide instructions to the propulsion system 505 to cause the propulsion system 505 to move, direct, or slow down the TMS 50A or the underwater vehicle 215. The remote control unit 540 can receive an indication from a person or can automatically generate instructions based on a configuration, policy, or setting. For example, the remote control unit 540 can be configured to instruct the TMS 50A or the underwater vehicle 215 to follow the vessel 5 at a predetermined location relative to a portion of the vessel 5. The remote control unit 540 can receive location information for the TMS 50A or the underwater vehicle 215 from the local control unit 520. The location information can include a velocity, location or orientation of the TMS 50A or the underwater vehicle 215. The remote control unit 540 can determine, based on the received location, velocity, or orientation information, to provide an instruction to the local control unit 520 to adjust the location, velocity or orientation.

In some embodiments, the local control unit 520 can monitor the location, velocity and orientation of the TMS 50A or the underwater vehicle 215, and automatically instruct the thruster 525 or engine 515 to generate more or less force to adjust the velocity, orientation, or direction. The local control unit 520 can monitor an orientation of the TMS 50A or the underwater vehicle 215 and determine that the case is leaning to a side. For example, the TMS 50A or the underwater vehicle 215 may lean to a side if the case is towed by a vessel 5 that is turning. The local control unit 520, responsive to detecting that the TMS 50A or the underwater vehicle 215 is leaning at an angle greater than a predetermined threshold (e.g., 10 degrees, 15 degrees, 20 degrees 30 degrees, 40 degrees) in a plane orthogonal to the direction of motion, can steer or thrust the TMS 50A or the underwater vehicle 215 to re-orient the case.

In some embodiments, the local control unit 520 can include one or more sensors to detect the location of the TMS 50A or the underwater vehicle 215 relative to the vessel 5. For example, the control unit 520 can include a proximity sensor to detect a location of the case relative to the vessel 5. In some embodiments, the remote control unit 540 on the vessel can generate beacons or pings that the local control unit 520 can detect to triangulate a position of the TMS 50A or the underwater vehicle 215 relative to the vessel 5.

For example, the local control unit 520 can include an instruction to follow an object moving through an aqueous medium, or an instruction to follow a vessel 5 towing TMS 50A or the underwater vehicle 215 through an aqueous medium. The object can include, for example, a vessel 5, buoy, water vehicle, transfer device, or skid structure. The local control unit 520 can include sensors such as a camera, position sensor, motion sensor, proximity sensor, transducers, radar, or other sensors that allow the local control unit 520 to determine a change in a position of the object, and move the TMS 50A or the underwater vehicle 215 to follow the object at a predetermined distance from the object. In some embodiments, the remote control unit 540 can provide an indication to the local control unit 520 as to a change in direction, speed or position of the vessel 5. The local control unit 520 can receive this indication of a change in direction or speed of the vessel 5, and adjust a speed or direction of the TMS 50A or the underwater vehicle 215 accordingly.

The network 535 can include a wired or wireless network. The network 535 can include a wire such as an umbilical cable 44A or a tether 46A from the vessel 5. Instructions can be conveyed via the network 535 using one or more communication protocols. The network 535 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 535 may be any type and/or form of network. The geographical scope of the network 535 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 535 may be an overlay network which is virtual and sits on top of one or more layers of other networks. The network 535 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 535 may be a type of a broadcast network, a telecommunications network, a data communication network, or a computer network. The network 535 can include wireless communication technologies such as Bluetooth, Zigbee, or RFID. The network 535 can allow for communication using small, low-power digital radios based on the IEEE 802.15.4 standard for WPANs, such as those based on the ZigBee standard. Systems based on the ZigBee standard can use radio-frequency (RF) and provide a long battery life and secure networking.

Figure 6:
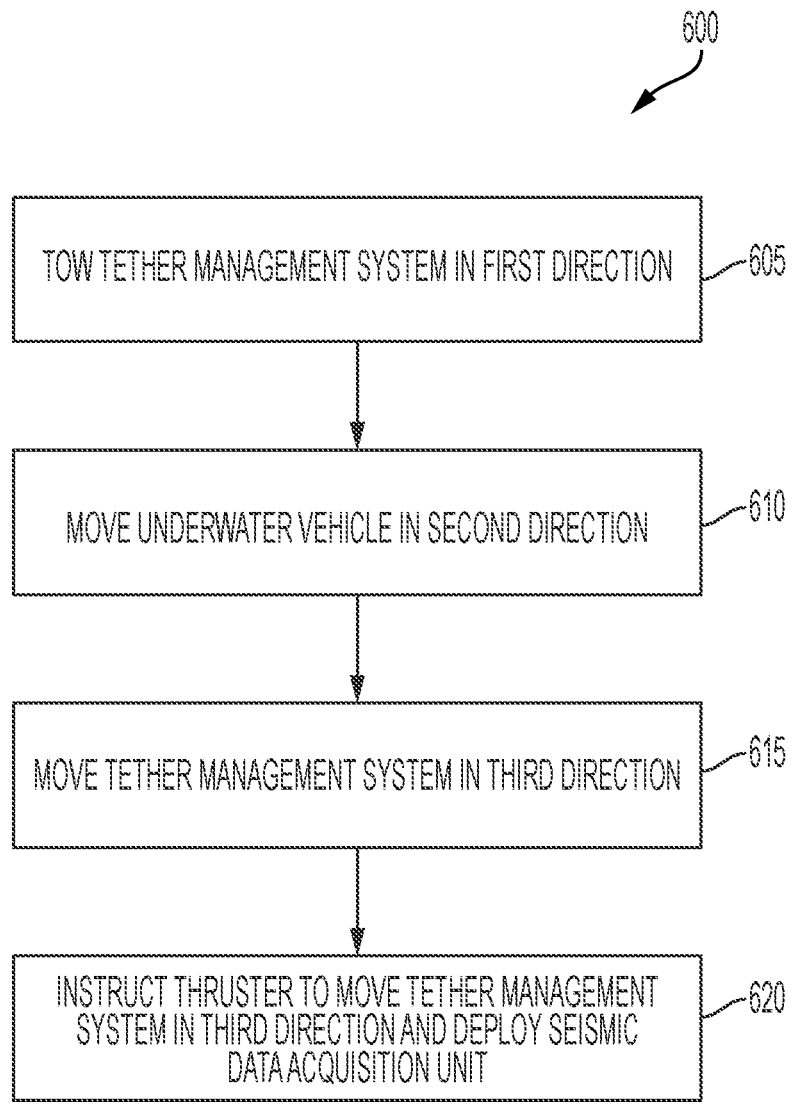
FIG. 6 shows a flow diagram of an example method for deploying seismic sensor devices on a seabed in accordance with an embodiment.

FIG. 6 shows a flow diagram of an example method for deploying seismic sensor devices on a seabed. The method 600 can be executed, for example, by the local control unit 520 of the TMS 50A or the underwater vehicle 215, or a remote control unit 540 located on a vessel 5. The method 600 includes towing a tether management system through an aqueous medium in a first direction (ACT 605). As an example, a vessel 5 disposed on the surface of the aqueous medium is coupled to the TMS 50A, which is positioned sub-surface, by umbilical cable 44A. A control unit can instruct the vessel 5 to travel in a first direction 255 on the surface of the aqueous medium. As the TMS 50A is towed behind the vessel 5 by the umbilical cable 44A, the TMS 50A also travels in the first direction 255.

The method 600 includes moving an underwater vehicle in a second direction (ACT 610). As an example, FIG. 2 shows an underwater vehicle such as the underwater vehicle 215 positioned near the seabed. The underwater vehicle 215 is coupled to one end of the tether 46A, the other end of which is coupled to the TMS 50A. The movement of the vessel 5 in the first direction 255 also causes the underwater vehicle 215 to move in the first direction. The control unit can instruct the thrusters on the underwater vehicle 215 to activate such that the underwater vehicle 215 moves in the second direction 245. In some instances, the second direction 245 can be orthogonal to the first direction 255 of the vessel 5. In some examples, the second direction 245 can be at any non-zero angle with respect to the first direction 255 of the vessel 5. The control unit can instruct the thrusters, such as the propulsion systems 315 shown in FIG. 3 or the thrusters 525 shown in FIG. 5.

The method 600 includes moving the TMS in a third direction (ACT 615). The TMS can be moved in the third direction that is different from the first direction of the vessel. For example, referring to FIG. 2, the control unit can instruct the propulsion system in the TMS 50A to move the TMS 50A in the third direction 235. The third direction 235 can be different from the first direction 255 of the vessel 5. For example, the third direction 235 can be at a non-zero angle with respect to the first direction 255. As an example, the third direction 235 can be orthogonal to the first direction 255 of the vessel 5. The control unit can activate the propulsion system of the TMS 50A, such as the propulsion device 315 shown in FIG. 3 or the thrusters 525 shown in FIG. 5 to move the TMS 50A in the desired third direction 235.

The method 600 includes instruct thruster to move the TMS in the third direction and deploy seismic data acquisition units (ACT 620). As an example, the control unit can instruct the thrusters to move the TMS in the third direction based, in part, on a cross-line location policy. The cross-line location policy can specify the conditions for employing the thrusters in the TMS 50A. In one example, the cross-line location policy can specify a first threshold distance. If the distance or span between adjacent rows of locations where seismic data acquisition units are to be deployed is greater than the first threshold distance, the cross-line location policy can indicate that the TMS 50A may employ thrusters to move the TMS 50A in lateral directions to aid in the deployment of the seismic data acquisition units. The cross-line location policy may also specify a second threshold distance. If the distance of span between adjacent rows of locations where seismic data acquisition units are to be deployed is also less than the second threshold distance, the policy can indicate use of thrusters of the TMS 50A during deployment. In some examples, the first threshold distance can include the width of the first deployment zone 225, and the second threshold distance can include the width of the second deployment zone 230. As discussed above, the width of the first deployment zone 225 can indicate the extent to which seismic data acquisition units can be deployed with employing the thrusters on the underwater vehicle 215 alone. If the distance between two adjacent rows of locations of deployment is wider than the first deployment zone 225, the vessel 5 may have to make two separate trips to deploy the seismic data acquisition units. If however, the distance the distance between two adjacent rows of locations of deployment is less than the width of the second deployment zone 230, the control unit can activate the propulsion system of the TMS 50A. The control unit can instruct the thrusters of each of the TMS 50A and the underwater vehicle 215 to move in the third direction and the second direction, respectively. When the underwater vehicle 215 reaches a target location for a data acquisition unit, the control unit can instruct a deployment mechanism in the underwater vehicle 215 to deploy the data acquisition unit.

The combination of the movement of the TMS 50A and the underwater vehicle 215 in a direction that is different from the first direction, such as for example, in a direction that is orthogonal to the first direction, the deployment zone of the system can be widened. The widening of the deployment zone allows the underwater vehicle 215 to deploy a larger number of seismic data acquisition units over a wider region in the seabed for each pass of the vessel 5. For example, referring to FIG. 2, the first right boundary 265 corresponds to the lateral extent, relative to the position of the vessel 5, to which the underwater vehicle 215 is able deploy seismic data acquisition units when the TMS 50A lacks thrusters, or the thrusters are not activated. However, when the control unit instructs the thrusters on the TMS 50A to move the TMS 50A in the third direction 235, the extent to which the underwater vehicle 215, which also moves in the second direction 245, is extended to the second right boundary 275.

In some examples, the control unit can determine a position of the underwater vehicle, such as the underwater vehicle 215, as the underwater vehicle moves in the second direction. For example, referring to FIG. 2, the control unit can instruct the thrusters on the underwater vehicle 215 to move the underwater vehicle 215 in the second direction 245. The control unit can also determine the position of the underwater vehicle 215 while the underwater vehicle 215 is moving in the second direction 245. Based on the location of the underwater vehicle 215, and the cross-line location policy, the control unit can instruct the thrusters in the TMS 50A to move the TMS 50A in the third direction 235. For example, the control unit can determine that target location for deployment of the seismic data acquisition unit is outside of the first deployment zone 225 of the underwater vehicle 215. The control unit can also determine that the target location could be reached by the underwater vehicle 215 upon movement of the TMS 50A in the third direction 235. That is, the target location is within the second deployment zone 230. The control unit can then actuate the thrusters of the TMS 50A to move the TMS 50A in the third direction 235.

Figure 7A:
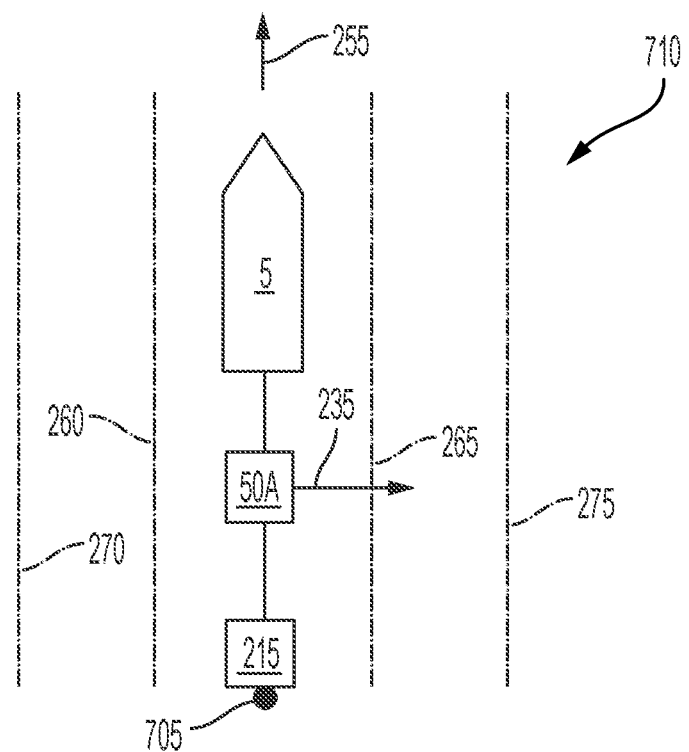
FIG. 7A shows a schematic of a stage in an example deployment sequence in accordance with an embodiment.
Figure 7B:
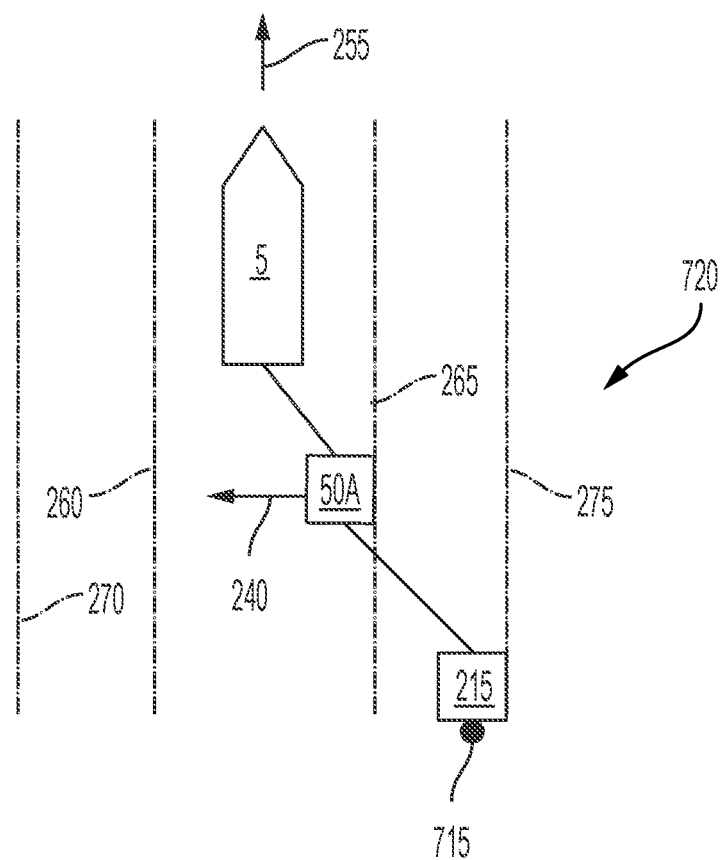
FIG. 7B shows a schematic of a stage in an example deployment sequence in accordance with an embodiment.
Figure 7C:
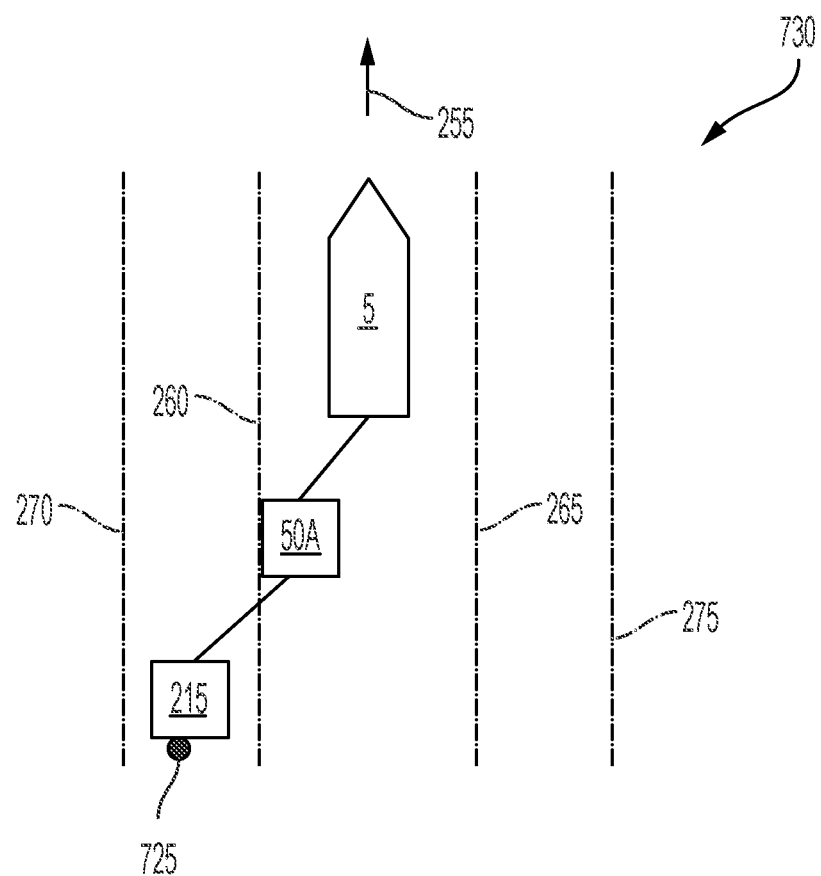
FIG. 7C shows a schematic of a stage in an example deployment sequence in accordance with an embodiment.

FIGS. 7A, 7B and 7C show a schematic of an example deployment sequence. FIGS. 7A, 7B and 7C show deployment of three seismic data acquisition units: a first seismic data acquisition unit 705 at a first stage 710 depicted in FIG. 7A, a second seismic data acquisition unit 715 at a second stage 720 depicted in FIG. 7B, and a third seismic data acquisition unit 725 at a third stage 730 depicted in FIG. 7C. At the first stage 710 depicted in FIG. 7A, the underwater vehicle 215 deploys a first seismic data acquisition unit 725 at a first location on the ocean bottom. The first second and third seismic data acquisition units 715, 720 and 725 can include or refer to seismic data acquisition unit 30 depicted in FIG. 1.

The first location can be any location that is within the extended deployment zone bounded by the second left boundary 270 and the second right boundary 275. Subsequent to the deployment of the first seismic data acquisition unit 705, the control unit can determine the target location of the second seismic data acquisition unit 715. For example, the control unit can determine that the target location is between the first right boundary 265 and the second right boundary 275. Based on the second target location and based on the cross-line location policy, the control unit can activate the thrusters on the TMS 50A to move the TMS 50A in the third direction 235. The control unit can also instruct the thrusters on the underwater vehicle 215 to actuate and to move the underwater vehicle 215 in the second direction 245. The sole or the combined movement of the TMS 50A and the underwater vehicle 215 can result in the underwater vehicle 215 being positioned between the first right boundary 265 and the second right boundary 275. As the underwater vehicle 215 moves forward by the towing action of the vessel 5 in the first direction, the underwater vehicle 215 can arrive at the target location. At the second stage 720 depicted in FIG. 7B, the underwater vehicle 215 reaches the target location and deploys the second seismic data acquisition unit 715.

Subsequent to the deployment of the second seismic data acquisition unit 715, the control unit can determine the third target location for deploying the third seismic data acquisition unit 725. As an example, the control unit may determine that the third target location lies between the first left boundary 260 and the second left boundary 270. The control unit can also determine that the current location of the underwater vehicle 215 is not near the third target location. Based on the cross-line location policy, the control unit can instruct the thrusters on the TMS 50A to move the TMS 50A in a fourth direction 240 depicted in FIG. 7B. The fourth direction 240 can be opposite to the third direction 235. As a result, the TMS 50A can move from the first right boundary 265 towards the first left boundary 260. The control unit can also activate the thrusters on the underwater vehicle 215 to move the underwater vehicle 215 in the same direction as the TMS 50A. The control unit can continue to activate the thrusters of the TMS 50A and the underwater vehicle 215 until the position of the underwater vehicle 215 is in line with the third target location between the first left boundary 260 and the second left boundary 270. When the forward movement, in the first direction 255, causes the underwater vehicle 215 to be positioned above the third target location, the control unit can instruct the underwater vehicle 215 to deploy the third seismic data acquisition unit 725 as depicted in FIG. 7C.

Figure 8:
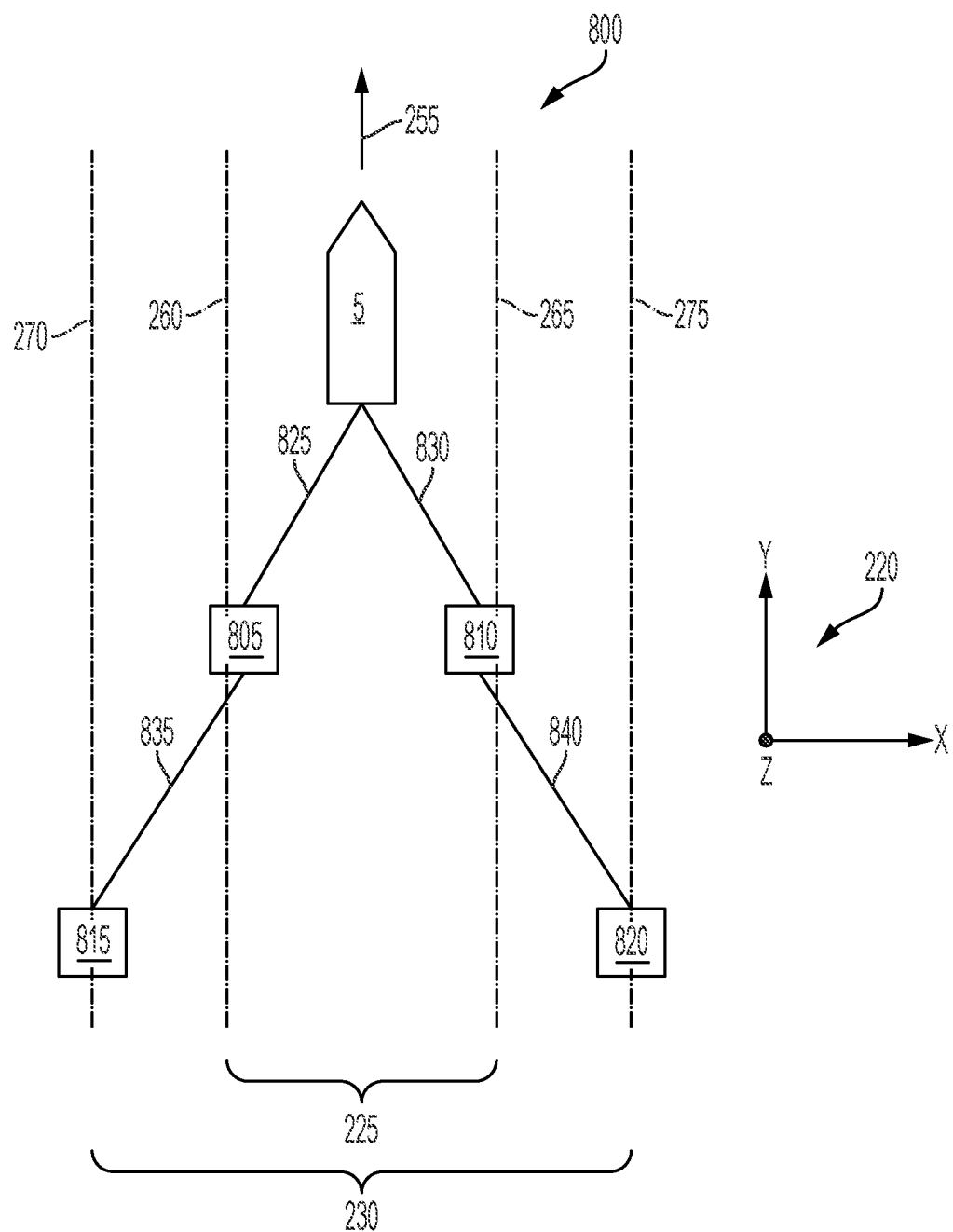
FIG. 8 shows a top schematic view of another system for acquiring seismic data in accordance with an embodiment.

FIG. 8 shows a top schematic view of another system 800 for acquiring seismic data in accordance with an embodiment. The system 800 includes a vessel 5, a first TMS 805, a second TMS 810, a first ROV 815 (e.g., an ROV 35A or an underwater vehicle 215), a second ROV 820 (e.g., an ROV 35A or an underwater vehicle 215), a first umbilical cable 825 (e.g., a cable 44A), a second umbilical cable 830 (e.g., a cable 44A), a first tether 835 (e.g., a tether 46A), and a second tether 840 (e.g., a tether 46A). The system 800 shown in FIG. 8 is similar in many aspects to the system 200 discussed above in relation to FIG. 2. However, while the system 200 included a single pair of TMS 50A and underwater vehicle 215, the system 800 shown in FIG. 8 includes two pairs of TMS and ROVs towed by the vessel 5. The first umbilical cable 825 is coupled to the vessel 5 and the first TMS 805. The second umbilical cable 830 is coupled to the vessel 20 and the second TMS 810. In some examples, the first umbilical cable 825 and the second umbilical cable 830 can be connected a same pulley on the vessel 5. In some examples, the first umbilical cable 825 and the second umbilical cable 830 can be connected to separate respective cranes on the vessel 5. The first tether 835 is coupled between the first TMS 805 and the first ROV 815, while the second tether 840 is coupled between the second TMS 810 and the second ROV 820.

Each of the first TMS 805, the second TMS 810, the first ROV 815, and the second ROV 820 can be equipped with propulsion systems, such as the propulsion systems discussed above in relation to FIGS. 3-5. The control unit can control the operation of thrusters in the TMSs and the ROVs such that the TMSs and the ROVs can move in a direction that is lateral to the first direction 255 of the motion of the vehicle. For example, the control unit can actuate the thrusters in the first TMS 805 and the first ROV 815 to cause the first TMS 805 and the first ROV 815 to move in a left lateral direction with respect to the first direction 255. The movement of the first TMS 805 and/or the first ROV 815 an allow deployment of seismic data acquisition units beyond the first deployment zone 225 and into the second deployment zone 230.

Similarly, the control unit can actuate the propulsion systems of the second TMS 810 and the second ROV 820, such that the second TMS 810 and the second ROV 820 move in a direction that is to the right of and lateral to the first direction 255 of the vessel 5. Including a second pair of TMS and ROV can increase a number of seismic data acquisition units that can be deployed per unit time.

Figure 9:
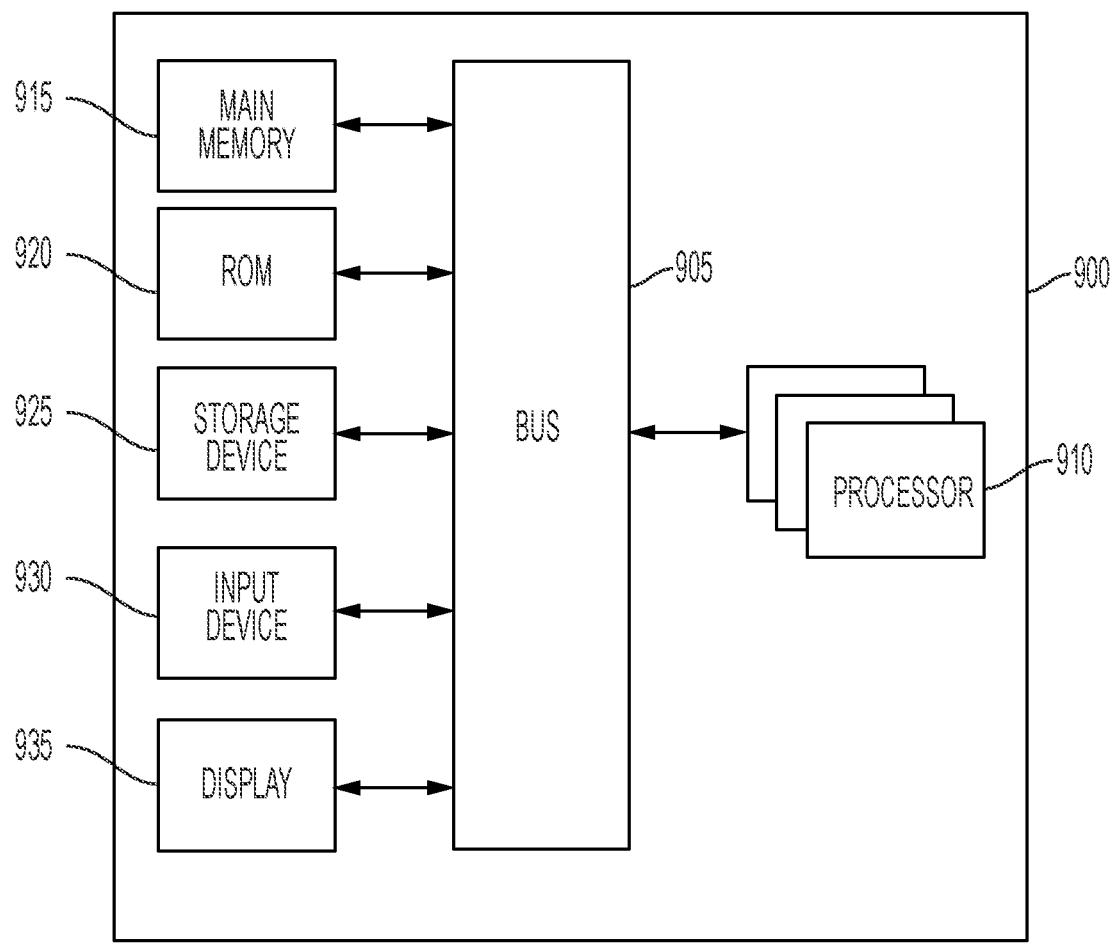
FIG. 9 is a block diagram of a computer system in accordance with an embodiment.

FIG. 9 is a block diagram of a computer system 900 in accordance with an embodiment. The computer system or computing device 900 can be used to implement one or more control unit, sensor, interface or remote control of system 200, system 300, system 500, method 600, or system 800. The computing system 900 includes a bus 905 or other communication component for communicating information and a processor 910*a-n* or processing circuit coupled to the bus 905 for processing information. The computing system 900 can also include one or more processors 910 or processing circuits coupled to the bus for processing information. The computing system 900 also includes main memory 915, such as a random access memory (RAM) or other dynamic storage device, coupled to the bus 905 for storing information, and instructions to be executed by the processor 910. Main memory 915 can also be used for storing seismic data, binning function data, images, reports, tuning parameters, executable code, temporary variables, or other intermediate information during execution of instructions by the processor 910. The computing system 900 may further include a read only memory (ROM) 920 or other static storage device coupled to the bus 905 for storing static information and instructions for the processor 910. A storage device 925, such as a solid state device, magnetic disk or optical disk, is coupled to the bus 905 for persistently storing information and instructions.

The computing system 900 may be coupled via the bus 905 to a display 935 or display device, such as a liquid crystal display, or active matrix display, for displaying information to a user. An input device 930, such as a keyboard including alphanumeric and other keys, may be coupled to the bus 905 for communicating information and command selections to the processor 910. The input device 930 can include a touch screen display 935. The input device 930 can also include a cursor control, such as a mouse, a trackball, or cursor direction keys, for communicating direction information and command selections to the processor 910 and for controlling cursor movement on the display 935.

The processes, systems and methods described herein can be implemented by the computing system 900 in response to the processor 910 executing an arrangement of instructions contained in main memory 915. Such instructions can be read into main memory 915 from another computer-readable medium, such as the storage device 925. Execution of the arrangement of instructions contained in main memory 915 causes the computing system 900 to perform the illustrative processes described herein. One or more processors in a multi-processing arrangement may also be employed to execute the instructions contained in main memory 915. In some embodiments, hard-wired circuitry may be used in place of or in combination with software instructions to effect illustrative implementations. Thus, embodiments are not limited to any specific combination of hardware circuitry and software.

Although an example computing system has been described in FIG. 9, embodiments of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While various inventive embodiments have been described and illustrated herein, those of ordinary skill in the art will readily envision a variety of other means or structures for performing the function or obtaining the results or one or more of the advantages described herein, and each of such variations or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, or configurations will depend upon the specific application or applications for which the inventive teachings are used. The foregoing embodiments are presented by way of example, and within the scope of the appended claims and equivalents thereto other embodiments may be practiced otherwise than as specifically described and claimed. The systems and methods described herein are directed to each individual feature, system, article, material, or kit, described herein. In addition, any combination of two or more such features, systems, articles, materials, kits, or methods, if such features, systems, articles, materials, kits, or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Generally, program modules include routines, programs, objects, components, data structures, or other components that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." References to "or" may be construed as inclusive so that any terms described using "or" may indicate any of a single, more than one, and all of the described terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B,") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. A system to perform a seismic survey in a marine environment, comprising:
   a tether management system towed, via a first cable, by a vessel that moves through an aqueous medium in a first direction;
   an underwater vehicle connected, via a second cable, to the tether management system, the underwater vehicle to move in a second direction different from the first direction to deploy seismic data acquisition units on an ocean bottom, wherein the second direction is perpendicular to the first direction;
   a thruster coupled to the tether management system to move the tether management system in a third direction different from the first direction, wherein the third direction is perpendicular to the first direction to increase the lateral off-set of the underwater vehicle from the first direction, and the third direction is parallel to the second direction; and a control unit comprising one or more processors to instruct, based on a set of conditions, the thruster to move the tether management system in the third direction different from the first direction to allow the underwater vehicle to deploy at least one of the seismic data acquisition units on the ocean bottom.

2. The system of claim 1, comprising the control unit to:

determine a position of the underwater vehicle as the underwater vehicle moves in the second direction; and instruct, based on the position of the underwater vehicle and the set of conditions, the thruster to move in the third direction.

3. The system of claim 1, comprising the control unit to:

instruct, based on the set of conditions, the thruster to move the tether management system in the third direction to extend a deployment zone of the underwater vehicle.

4. The system of claim 1, comprising:

the underwater vehicle to deploy a first seismic data acquisition unit at a first location on the ocean bottom;

the control unit to instruct, subsequent to deployment of the first seismic data acquisition unit at the first location and based on the set of conditions, the thruster to move the tether management system in the third direction; and the underwater vehicle to deploy, subsequent to movement of the tether management system by the thruster, a second seismic data acquisition unit at a second location on the ocean bottom.

5. The system of claim 4, comprising:

the control unit to instruct, subsequent to deployment of the second seismic data acquisition unit at the second location and based on the set of conditions, the thruster to move the tether management system in a fourth direction opposite the third direction; and the underwater vehicle to deploy, subsequent to movement by the thruster of the tether management system in the fourth direction, a third seismic data acquisition unit at a third location on the ocean bottom.

6. The system of claim 1, comprising:

the underwater vehicle to deploy a first seismic data acquisition unit at a first location on the ocean bottom within a first deployment zone of the underwater vehicle;

the control unit to instruct, subsequent to deployment of the first seismic data acquisition unit at the first location and based on the set of conditions, the thruster to move the tether management system in the third direction; and the underwater vehicle to deploy, subsequent to movement of the tether management system by the thruster, a second seismic data acquisition unit at a second location on the ocean bottom within a second deployment zone outside the first deployment zone, the second deployment zone not accessible by the underwater vehicle prior to movement by the thruster of the tether management system in the third direction.

7. The system of claim 1, wherein the tether management system comprises the control unit.

8. The system of claim 1, wherein the underwater vehicle comprises the control unit.

9. The system of claim 1, wherein the vessel comprises the control unit.

10. The system of claim 1, wherein the control unit is remote from, and external to, the tether management system.

11. The system of claim 1, comprising:

a second tether management system towed, via a third cable, by the vessel; and a second underwater vehicle connected, via a fourth cable, to the second tether management system.

12. The system of claim 1, comprising:

a second tether management system towed, via a third cable, by the vessel;

a second thruster coupled to the second tether management system to move the tether management system in a fourth direction different from the first direction;

a second underwater vehicle connected, via a fourth cable, to the second tether management system, the second underwater vehicle to move in a fifth direction different from the first direction to deploy second seismic data acquisition units on the ocean bottom; and the control unit to instruct, based on the set of conditions, the second thruster to move the second tether management system in the fourth direction different from the first direction to cause the second underwater vehicle to deploy at least one of the second seismic data acquisition units on the ocean bottom.

13. The system of claim 1, wherein the set of conditions are configured to extend a lateral range of deployment by at least 100 meters.

14. The system of claim 1, wherein the first direction intersects with the second direction and the third direction.

15. A method of performing a seismic survey in a marine environment, comprising:

towing, by a vessel via a first cable, a tether management system through an aqueous medium in a first direction;

moving, by an underwater vehicle connected, via a second cable, to the tether management system, in a second direction different from the first direction to deploy seismic data acquisition units on an ocean bottom, wherein the second direction is perpendicular to the first direction;

exerting, by a thruster coupled to the tether management system, a force to move the tether management system in a third direction different from the first direction, wherein the third direction is perpendicular to the first direction to increase the lateral off-set of the underwater vehicle from the first direction, and the third direction is parallel to the second direction; and instructing, by a control unit comprising one or more processors, based on a set of conditions, the thruster to move the tether management system in the third direction different from the first direction to cause the underwater vehicle to deploy at least one of the seismic data acquisition units on the ocean bottom.

16. The method of claim 15, comprising:

determining a position of the underwater vehicle as the underwater vehicle moves in the second direction; and instructing, based on the position of the underwater vehicle and the set of conditions, the thruster to move in the third direction.

17. The method of claim 15, comprising:

instructing, based on the set of conditions, the thruster to move the tether management system in the third direction to extend a deployment zone of the underwater vehicle.

18. The method of claim 15, comprising:

deploying, by the underwater vehicle, a first seismic data acquisition unit at a first location on the ocean bottom;

instructing, by the control unit subsequent to deployment of the first seismic data acquisition unit at the first location and based on the set of conditions, the thruster to move the tether management system in the third direction; and deploying, by the underwater vehicle subsequent to movement of the tether management system by the thruster, a second seismic data acquisition unit at a second location on the ocean bottom.

19. The method of claim 18, comprising:

instructing, subsequent to deployment of the second seismic data acquisition unit at the second location and based on the set of conditions, the thruster to move the tether management system in a fourth direction opposite the third direction; and deploying, by the underwater vehicle subsequent to movement by the thruster of the tether management system in the fourth direction, a third seismic data acquisition unit at a third location on the ocean bottom.

* * * * *